United States Patent [19]
Schroeder et al.

[11] Patent Number: 4,828,915
[45] Date of Patent: May 9, 1989

[54] ORIENTED EVOH/NYLON BLEND FILM

[75] Inventors: George O. Schroeder, Appleton; David L. Newsome, Neenah; William B. Haffner, Menasha, all of Wis.

[73] Assignee: American National Can Company, Greenwich, Conn.

[21] Appl. No.: 667,939

[22] Filed: Nov. 2, 1984

Related U.S. Application Data

[63] Continuation of Ser. No. 464,730, Feb. 3, 1983, abandoned, which is a continuation of Ser. No. 290,171, Aug. 5, 1981, abandoned.

[51] Int. Cl.$^4$ .................. B32B 27/06; B32B 27/10; C08L 29/04; B29C 47/00
[52] U.S. Cl. .................. 428/332; 428/474.9; 428/475.2; 428/475.8; 428/476.1; 428/516; 428/518; 264/514; 264/176.1; 264/171; 264/512; 264/185; 525/56; 525/58
[58] Field of Search .................. 428/332, 474.9, 475.2, 428/476.1, 475.8, 516, 518; 264/514, 176.1, 171, 512, 185; 525/56, 58

[56] References Cited

U.S. PATENT DOCUMENTS

| | | | |
|---|---|---|---|
| 3,882,259 | 5/1975 | Nohara et al. | 428/516 |
| 4,064,296 | 12/1977 | Bornstein et al. | 428/34.9 |
| 4,239,826 | 12/1980 | Knott II et al. | 428/36.7 |
| 4,240,993 | 12/1980 | Sun | 428/500 |
| 4,243,074 | 1/1981 | Strutzel et al. | 428/34.8 |
| 4,243,724 | 1/1981 | Strutzel et al. | 428/474.7 |
| 4,261,482 | 4/1981 | Yamada et al. | 428/36.6 |

Primary Examiner—P. C. Ives
Attorney, Agent, or Firm—Paul R. Audet

[57] ABSTRACT

Molecularly oriented films are produced which comprise a layer containing a blend of EVOH and nylon. The films exhibit a desirable balance of oxygen barrier and strength properties, and are ideally suited for many packaging applications.

51 Claims, No Drawings

ORIENTED EVOH/NYLON BLEND FILM

This is a division of application Ser. No. 464,730, filed 2/3/83 now abandoned, which is a continuation of Ser. No. 290,171, filed 8/5/81, abandoned.

BACKGROUND OF THE INVENTION

It is, of course, highly conventional to utilize films of various synthetic resinous thermoplastic materials for the packaging of foods and like products. Although the necessary anc desirable properties will depend to an extent upon the specific applications for which the films are intended, normally they should exhibit good strength, toughness, abrasion and flex-crack resistance, gloss, and heat sealability. Moreover, because of the susceptibility of many food products to deterioration upon exposure to oxygen, it will often be imperative that the film employed exhibit good barrier properties.

As is also well known, it is common practice to package meat and similar commodities in molecularly oriented films (usually in the form of bags) that can shrink upon exposure to heat. The need for good strength characteristics is particularly acute in such instances, because of the vulnerability of the film to damage under the conditions of use. More particularly, the films are subjected to relatively high tensile stresses during normal shrinkage, and this is compounded by the fact that they are used at elevated temperatures and, in many instances, under vacuum. Furthermore, sharp and/or rough bone portions protruding from the meat will considerably increase the chances of failure during shrinkage, and cutting by the metal clip that is normally applied to close the bag is a common source of difficulty.

By and large, the combination of characteristics necessary to provide films that are suited for use in many packaging applications is not afforded in a single layer product, and therefore numerous multilayer films have been developed or proposed. For example, while nylon films offer strength, toughness, and abuse resistance, they are moisture sensitive, anc are not therefore suited for use by themselves under conditions of high humidity; nylon is therefore often coated with saran (vinyl chloride/vinylidene chloride copolymer) to provide moisture-barrier properties. Saran itself is widely used as a substrate in mulilayer film laminates, and shrink films that are eminantly well-suited for meat packaging and other applications, and which may comprise a core of saran with adjacent layers of ethylene/vinyl acetate copolymer (EVA) blends, are disclosed and claimed in Widiger et al U.S. Pat. No. 4,247,584; those films provide an excellent balance and combination of properties. Saran, however, is relatively expensive, its processing entails a relatively high power consumption, it tends to show a brownish coloration, and there is concern that such films may entail health hazards due to the presence of residual vinyl chloride monomer therein.

It is suggested in the foregoing Widiger et al patent that a core layer of ethylene vinyl alcohol copolymer (EVOH) be substituted for the saran layer, so as to provide the outstanding oxygen barrier properties thereof while avoiding the disadvantages involved in using saran. EVOH, however, is moisture sensitive and relatively brittle, particularly in the thin gauges in which it is most economically utilized, and the resin is also quite difficult to process.

The foregoing disadvantages of EVOH have, to a large extent, been obviated by the incorporation therewith of a substantial amount of nylon and a plasticizer therefor, which blends and the fabrication of films therefrom are the subject matter of copending U.S. patent application Ser. No. 249,974, entitled NYLON/EVOH BLENDS and filed on Apr. 1, 1981 in the names of Thomas W. Odorzynski and Jack E. Knott, II. Although films of those blends are idealy suited for food packaging and similar applications, still they are not optimal in all respects. In particular, it would be most desirable to strengthen and toughen them, to further improve their barrier properties, to increase clarity and heat stability, to minimize moisture sensitivity, and to fabricate them to the thinnest practicable gauges.

Accordingly, it is a primary object of the present invention to provide a novel film produced from a blend of nylon and EVOH, which film exhibits high degrees of toughness, strength, clarity, and heat stability, while also exhibiting low moisture sensitivity and oxygen permeability.

It is also an object of the invention to provide thingauge films of the foregoing nature, which have been molecularly oriented to a relatively high degree.

Another object of the invention is to provide novel methods by which films having the foregoing features and advantages can be produced on a commercially and economically practicable basis.

SUMMARY OF THE INVENTION

It has now been found that certain of the foregoing and related objects of the invention are readily attained in a film-producing method wherein a blend is formed comprising a nylon resin, an EVOH copolymer, and in some instances also a plasticizer for the nylon resin. In accordance therewith, about 90 to 10 weight percent of a nylon polyamide resin is intimately admixed with about 10 to 90 weight percent of an EVOH copolymer having a molecular weight of about 15,000 to 30,000 and a melting point temperature of about 325° to 375° Fahrenheit. The plasticizer, when used, is incorporated with the nylon resin and the EVOH copolymer in an amount of about 2 to 25 percent, based upon the weight of the nylon resin, and it will be effective to lower the processing temperature of the total blend to a value approximating that of the copolymer itself, and below the temperature at which any substantial degradation would occur therein. The blend is heated to the processing temperature, and is forced through an extrusion die to produce a film thereof. Thereafter, the temperature of the film is adjusted to permit effective molecular orientation therein, and it is stretched at about that temperature to effect at least uniaxial molecular orientation. Finally, the film is cooled to obtain a product of relatively thin gauge having desirable levels of strength, toughness and oxygen barrier capability.

In certain preferred embodiments, a film-forming nylon resin will be employed in an amount of about 75 to 25 percent and, conversely, the amount of the EVOH copolymer will be about 25 to 75 percent, with the plasticizer being included in an amount of about 5 to 15 percent, again based upon the weight of nylon present. The plasticizer, or the nylon ingredient itself if no plasticizer is incorporated, will normally be of such composition, and used in such a concentration, as to permit processing of the blend at a temperature of about 400° to 480° (and preferably about 430° to 450°) Fahrenheit, and generally the plasticizer will be compounded with the film-forming nylon resin prior to admixture with the ethylene vinyl alcohol copolymer. The plasticizer may be of either monomeric or polymeric nature, and suitable classes of compounds include long chain fatty acid amides, aromatic sulfonamides and polyamides and copolyamides having a molecular weight of 5,000 to 25,000 and a melting point temperature below about 400° Fahrenheit; specific preferred plasticizers are lauramide, o,p-toluenesulfonamide, N-ethyl-o,p-toluene-sulfonamide, and polyamides of 7,000 to 10,000 molecular weight.

In certain embodiments of the method, a second resin, different in composition from the blend, may be combined therewith in the die, to produce a laminar structure comprised of layers of the two components. The laminar structure will then be forced through the die to convert it to a film comprised of layers of the llend and of the second resin. The second resin will desirably be selected from the group consisting of polyolefins (especially polyethylene, polypropylene, and copolymers thereof), polyamides (i.e., nylon), ionomer resins, partially hydrolyzed ethylene vinyl acetate copolymer adhesives, anhydride-modified polyolefin adhesives, and ethylene/organic acid ester copolymer compositions (e.g., ethylene/vinyl acetate copolymer).

The film will normally be mechanically drawn in a first direction at a ratio greater than about 2:1, and preferably the draw ratio will be about 4:1, to effect molecular orientation therein, and this will usually be performed by stretching the film between two sets of rollers operating at different linear speeds. In many instances, it will be desirable to also stretch the film in a direction that is substantially transverse to the first direction of stretching, and at a ratio greater than about 2:1, to thereby produce biaxial molecular orientation therein. The film may be a single-ply structure, such as is produced by casting the resin extrudate upon a chill roll, or it may be a tubular structure made by a blown film extrusion technique, in which stretching in the transverse direction will be caused by internal fluid pressure within the blown bubble so as to induce the desired molecular orientation. Preferably the draw and stretch ratios will each be at least about 3:1, and most desirably the ratio will be at least about 4:1 in either or both directions.

Additional objects of the invention are attained by the provision of an oriented film composed and produced as described In certain preferred embodiments, the film will be a multilayer laminate comprised of a nylon/EVOH blend layer in combination with at least one second layer of a resin composition different from that of the blend, as also described. In especially desirable films, the second layer will be comprised of an EVA copolymer or a blend thereof, a polyolefin, or a nylon polymer, and generally a layer of the same second resin will be provided on each side of the nylon/EVOH substrate.

In further embodiments of the invention, the nylon ingredient of the first layer will be interaally plasticized, so as to make it unnecessary to include any separate plasticizer. Thus, it may be a nylon copolymer (random or block) or an alloy of nylon, wherein the comonomer or alloying ingredient will disrupt the crystallinity of the normally higher melting nylon moiety, to thereby effectively reduce the processing temperature thereof. Generally, the higher melting nylon moiety of a suitable random copolymer will have a six-carbon atom structure; the comonomer may have a 12-, 36-, or 66-carbon atom structure. Appropriate nylon block copolymers for example can be produced by reacting a 12-carbon amide with an ether or olefin molecule, and exemplary alloys may be made by combining a polyolefin with nylon 6. Finally, the nylon ingredient itself may have a melting point value that is sufficiently low so as to obviate the need for any plasticization beyond that which is inherent in the resin itself.

DETAILED DESCRIPTION OF THE PREFERRED EMBODIMENTS

EVOH copolymers that are suitable for use herein will 5 generally contain at least about 55, and as much as 80, weight percent of vinyl alcohol in the molecule; the preferred copolymers will contain about 60 to 75 weight percent of the vinyl alcohol moeity, and the remainder of the molecule will consist essentially of ethylene. However, because such products are produced by hydrolysis of ethylene vinyl acetate copolymers, some residual vinyl acetate will usually be present in the resin; normally, there will be less than about 3 weight percent of vinyl acetate, and preferably it will be present at a level below 1.5 percent. The EVOH copolymers will typically have molecular weights in the range of about 20,000 to 30,000, corresponding roughly to melt indices of about 9 to 1.5; the melt index values for these resins are determined in accordance with ASTM Test D-1238, Procedure E or L , using a weight of 2160 grams and a temperature of either 190° or 210° Centigrade, as appropriate. Typically, the copolymers will have densities of about 1.1 to 1.2, and their melting points will normally range from about 325° to 375° Fahrenheit; suitable temperatures for processing them will be about 400° to 480° (and preferably about 430° to 450°) Fahrenheit. While the degradation temperature of EVOH is generally regarded to be about 450°, it should be appreciated that this is not inconsistent, due to the residence time factor and its effect upon degradation. Specific EVOH resins that are suitable for use are available from Kuraray and from Nippon Gohsei, both of Japan, the products of the former company being designated EP-E and EP-F, and those of the latter company being designated GL-D and GL-E. EP-E and EP-F contain about 45 and 35 percent of ethylene in the molecule and have melt flow values (as determined at a temperature of 190° Centigrade) of 5.8 and 1.5, respectively; GL-D and GL-E contain 29 and 40 percent of ethylene and exhibit melt flow values of 7.4 and 8.0 (determined at 210° Centigrade), respectively.

When a separate plasticizer is to be included in the blend, virtually any high molecular weight, relatively high melting film-forming polyamide resin may be utilized; while the polycondensation resins such as nylon 66 may be employed to advantage, for most purposes the addition polymer nylon 6 will be preferred. To be suitable for such use, the nylon will generally have a molecular weight in the range of 20,000 to 30,000, and a melting point temperature of about 415° to 440° Fahrenheit, with a melting point temperature of about 430° being optimal in many cases. Such polyamide resins are normally processed at temperatures of about 510° to 540°, thus giving rise to the fundamental difficulty to which the foregoing Odorzinski and Knott application is addressed; i.e., the provision of a nylon/EVOH blend that can be extruded at temperatures below the degradation temperature of EVOH.

As taught therein, the desired result is achieved by the incorporation into the composition of an agent that serves as an effective plasticizer for the film-forming nylon. While some of the agents utilized may not previously have been regarded as plasticizers, in those and the present blends they do appear to perform that function. In other words, the plasticizing agents are capable of intermolecular hydrogen bonding and disruption of crystallinity within the polyamide structure, to effectively lower the temperature at which processing can be carried out. As a result, film-forming nylons that normally process at a temperature of about 510° to 540° Fahrenheit become processable at temperatures that are considerably lower and that are, in fact, within a range of temperatures at which the EVOH copolymer is also processable and not subject to significant degradation. More particularly, the externally plasticized film-forming polyamide resins, so plasticized, are processable with the EVOH resins at temperatures of about 400° to 480° Fahrenheit, with preferred temperatures being about 430° to 450°.

The amount of plasticizer utilized may vary between fairly wide limits, and as little as 2 percent or as much as 25 percent, based upon the weight of the nylon resin, may be employed. For satisfactory results, however, it will often be necessary to use a concentration of plasticizer in excess of 2 percent, and therefore 5 weight percent will usually represent a preferred lower limit for such blends. Conversely, amounts of plasticizer in excess of about 15 weight percent will frequently produce little added benefit, insofar as processing is concerned, and therefore that concentration represents a preferred upper limit in some instances. The amount utilized in any given case will, of course, depend upon a number of factors, including the composition of the nylon film-forming resin and of the specific plasticizer employed, the actual processing temperatures involved, etc.

Insofar as specific plasticizers are concerned, the preferred agents fall within three main categories, namely the long chain fatty acid amides (i.e., those containing 16 to 18 carbon atoms in the chain), the aromatic sulfonamides, and the polyamides and copolyamides which exhibit a melting point temperature of less than about 400° Fahrenheit. Within those categories, the most desirable plasticizers are lauramide, o,p-toluenesulfonamide, N-ethyl-o,p-toluenesulfonamide (the two sulfonamides of course being mixtures of the ortho and para isomers), and polyamides such as nylon 6,36, nylon 11 and nylon 12 having molecular weights of about 7,000 to 10,000. Other suitable specific products that can be used as the plasticizing agent include nylon 11 and 12 of about 25,000 molecular weight and melting at temperatures of about 370° and 350° Fahrenheit, respectively, 2,2,4-trimethyl-1,3-pentanediol, cumylphenyl-benzoate, and a product offered commercially by Paul and Stein Brothers of New York, N.Y. under the designation STYSOLAK AW, referred to as a polyethylene oxide. Based upon the foregoing, it is believed that other suitable plasticizing agents for use in the compositions of the present invention will occur to those skilled in the art. For example, it should be mentioned that the two aromatic sulfonamide compounds specified above are commercially available from the Monsanto Chemical Company under the designations SANTICIZER 9 and 8, respectively; other similar compounds sold under the same brand designation may also function desirably in the instant blends.

As indicated hereinabove, the blends utilized to produce the films of the invention or the core of a multilayer film embodying it, may utilize what may be regarded to be internally plasticized nylon rather than incorporating such a component as an independent third ingredient (i.e., in addition to a film-forming nylon and the EVOH copolymer). The internally plasticized nylons may be either random or block copolymers, or they may be alloys of a nylon resin with an alloying resin. In any event, it is believed that the comonomer (in the case of a copolymer) or the alloying resin (in the case of an alloy) disrupts the crystalline structure of the relatively high melting point nylon constituent and/or undergoes hydrogen or other secondary bonding therewith, so as to produce the desired effect. As will be appreciated, the ultimate objective is to provide a nylon ingredient which will be processable at approximately the temperature at which the EVOH can be processed without degradation, and this is true regardless of whether the effect is achieved by internal plasticization or through the incorporation of a separate plasticizing agent.

In more specific terms, nylon copolymers that are suitable for use without added plasticizers include nylon 6,12; 6,36; and 6,66, the primary criterion being that the copolymer must have a melting point temperature below about 400° Fahrenheit. Commercially availabe products of that nature that may suitably be employed include ULTRAMID KR 4600, available from Badische Anilin & Soda-Fabrik AG (BASF); NOVAMID 2030, available from Mitsubishi Chemical Co.; and DURATHANE, available from Farbenfabriken Bayer, A.G., all of which are believed to be nylon 6,66 copolymers wherein the respective moieties represent about 85 and 15 percent of the copolymer. Among the nylon alloys that are suitable for use are included the Unitika (of Japan) product sold under the designation "1030", and ZYTEL SUPERTUFF 811, sold by E. I. du Pont de Nemours & Co., both of which are believed to be alloys of a polyolefin with nylon 6. Finally, specific block copolymers that are found to be suitable include Huels (of Germany) "4018" and Emser (of Switzerland) ELY 1256, which are believed to be based upon nylon 12 with intervening blocks of polyether structure. Perhaps it should be pointed out that, although the foregoing nylon materials are capable of producing desirably processable blends with EVOH in the absence of any added plasticizer, the plasticizing agents hereinabove described may be included in addition, with added benefit in some instances Moreover, as also pointed out, for some applications a low melting nylon (e.g. nylon 11 or 12) can be used, without modification or added plasticizer, in combination with the EVOH, and that material can be blended in virtually any proportion with a high melting nylon, such as nylon 6. Typically, blends of EVOH with the alloys, the copolymers, and the low melting nylons, when not used as plasticizers (i.e., when used in amounts more than 25 percent of the total nylon content of the blend) will produce "soft" films which exhibit high levels of resistance to clip cutting and shrink hole formation, and are therefore especially well adapted to the production of shrink bags for the packaging of red meat, and the like.

In producing the externally plasticized blends of the invention, it will generally be desirable to premix the plasticizer with the film-forming polyamide, so as to ensure maximum effectivness in producing the desired result. This may best be done in a compounding extruder or the like, depending to some extent upon the physical state (i.e., whether it is a solid or a liquid) of the additive. It will generally be most advantageous to produce pellets of such plasticized polyamide, which can then be admixed with pellets of the EVOH copolymer(e.g., in a ribbon blender) prior to introduction into the extruder that is to be used for conversion to the film.

Such conversion may be effected in any suitable manner, as by cast or blown film extrusion. As indicated previously, the compositions of the invention may also be coextruded by such techniques with resins of different composition for various purposes, such as to enhance certain properties or to provide properties that are not possessed by the blend film itself. For example, to provide a packaqing material capable of heat sealing at relatively low temperatures, it may be desirable to provide a layer of EVA or an ionomer resin (i.e., duPont SURLYN) on at least one side of the film. It might be emphasized at this point that, due to the presence of nylon in the blend, it may be possible to achieve adequate adhesion between the blend layer and the EVA or SURLYN layer without the utilization of any added adhesive; the same is not generally true of films made of EVOH copolymer, per se. Moreover, even in those instances in which an adhesive layer is utilized, still the blends employed herein offer considerable advantage, in that the level of adhesion is enhanced considerably.

As taught in U.S. Pat. Nos. 4,233,367, to Ticknor and Rein, 4,239,826, to Knott and Wang, and 4,254,169 to Schroeder (all of which are of common assignment herewith), a number of extrudable adhesives suitable for use as noted above are available on the market, typical of which are the products sold by Chemplex Company under the PLEXAR designation, and described in U.S. Pat. Nos. 4,087,587 and 4,087,588, and the resins sold by U.S. Industrial Chemicals Company, division of National Distillers and Chemical Corp., under the designations S-2037 and S-2038, which are described in U.S. Pat. No. 4,239,826. In all instances, it is believed that such adhesives may be categorized as either an anhydride modified polyolefin or a partially hydrolyzed ethylene vinyl acetate copolymer. Other suitable adhesives are available from Norchem Company under the designation No. 2910, and from duPont as CXA 3101 (both being organic acid ester copolymer compositions).

Other synthetic resinous materials may also be employed adjacent a layer of the nylon/EVOH blend to provide laminates having desirable properties for particular applications, (with or without adhesive interlayers). A particularly desirable structure will comprise a core of a nylon copolymer (e.g. ULTRAMID) and an EVOH copolymer in percentages of about 20 to 30 and conversely 80 to 70, with outer layers of nylon 6. The outer layers will desirably each provide about 40 percent of the thickness of the film, with the core providing the remaining 20 percent thereof; in such a film, no added adhesive layer is required. The laminate will advantageously have an initial overall thickness of about 6 to 20 mils, and will be biaxially oriented to a finished thickness of about 0.4 to 1.25 mils, with orientation being effected at about a 4:1 ratio in each direction; conventional nylon orientating equipment may be utilized for that purpose. Such a product finds particular application as a cheese wrap, and may therefore serve to replace saran-coated nylon films, which are presently utilized for that purpose. One of the particular advantages of substituting the above-described film resides in the fact that it can be coextruded directly as a three-layer structure, thereby avoiding the expense entailed in the separate post-coating operations that are required to apply the saran to the nylon substrate.

Yet other possible multilayer film combinations can also be provided in accordance with the present invention, and numerous possibilities will occur to those skilled in the art. However, by way of further example, webs having desirable properties may be produced by combining layers of polyolefins with a core of the blend; typical polyolefins so used include high density polyethylene, low density polyethylene, linear low density ethylene polymers and copolymers, polypropylene, and ethylene/propylene copolymer. In such films, tie layers comprised of adhesive resins of the sort described above will often be advantageously used. As will also be appreciated by those skilled in the art, the number of layers constituting any particular multilayer film will be limited only by practical considerations, and as many as seven or more lamina may be feasible in accordance herewith.

Molecular orientation of the films of the invention may be effected utilizing any suitable technique, which will depend to considerable extent upon the structure of the film and the nature of the components of which it is comprised. For example, when the nylon utilized in the blend is of relatively high viscosity, or when the film is a multilayer laminate, the most practical manner of extruding the film and producing orientation therein will normally be by the so called "double bubble" technique. As is well known, in such a method the film may be extruded downwardly as a tube frmed by an annular die, and carried into a water quench tank, generally with a cascade of water on the outside surface providing initial cooling. The flattened tape is withdrawn from the quench bath, is reheated (normally in a seconc water bath) to its orientation temperature, is stretched in the machine direction between two sets of rolls that are so rotated as to establish a linear rate differential therebetween, and is simultaneously oriented in the transverse, or cross-machine, direction as an inflated bubble trapped between the nips of the rolls. In accordance with conventional practice, the film will usually be cooled by air in the orientation zone.

One of the outstanding benefits that results from use of the blends described herein is perhaps most significantly realized in connection with the foregoing orientation technique. Films of EVOH by itself have heretofore been found to be most difficult to produce by blown bubble extrusion and orientation, because EVOH is very sensitive to conditions of processing; the consequential unstability of the bubble has significantly limited the thicknesses in which the films could be fabricated (and, indeed, has discouraged any use of the process for EVOH), as a practical matter. The most problematic factor has entailed the provision of the degree of temperature control that is necessary during reheating to achieve adequate resistance to splitting or bursting of the bubble under the internal air pressures required for satisfactory orientation of the film. On the other hand, in the nylon-containing blends described herein the range of parameters under which such extrusion and orientation can be carried out is extended considerably, thus rendering the process, and the provision of oriented films comprising EVOH, much more practicable from a commercial standpoint. This is true, moreover, regardless of whether the film is of single layer construction or consists of a core of the EVOH blend with adjacent layers, which normally add toughness and strength and thereby help to support the bubble, enabling it to better withstand internal pressures.

Alternatively, and particularly when a single-layer film is produced utilizing a less viscous nylon resin in the blend, orientation may be effected on conventional nylon orientating equipment, consisting in general of drawing roll sets and a tentering frame. As yet another possibility, uniaxial orientation can be achieved by a fluid compression rolling technique, such as is described and claimed in U.S. Pat. Nos. 3,194,863; 3,504,075 and Re. 27,404. The choice of the particular technique employed will depend upon the composition and nature of the film to be produced, and will be apparent to those skilled in the art.

To achieve maximum benefit from orientation, a stretch ratio of at least 2:1 will be employed, and most desirably the ratio will be higher. Obviously, the greater the amount of stretching the higher the degree of orientation that will be induced and, in turn, the more pronounced will be the effects of orientaion; higher draw ratios also produce thinner films, thus maximizing the economic benefit.

A surprising result that appears to be realized in the practice of the present invention concerns the degree to which the blended compositions can be drawn and molecularly oriented. It is well known that nylon alone will normally survive a maximum draw ratio of about 4:1. Films made in accordance with the present invention, on the other hand, appear to be capable of surviving significantly higher draw ratios without failure or detrimental consequences. In view of the relative difficulty of processing and orienting EVOH, it would not have been expected that blends comprising substantial amounts of the copolymer would draw even as well as the nylon component alone, much less to a higher degree.

It should be noted that, subsequent to molecular orientation, the films of the present invention may or may not be heat set, the latter in accordance with conventional practice used in producing oriented nylon films. The consequence is, of course, that the film will either be heat shrinkable or not. As is also well known in the art, orientation must be effected at a temperature below the melting point of the film and above its glass transition temperature. In view of the fact that the film of the invention comprise a blend of nylon and EVOH, it is difficult to precisely define or to predict the temperature ranges within which orientation will be achieved most effectively. While this parameter will therefore normally be determined empirically, it may be noted by way of example that typical orientation temperatures will range from about 170° to 300° Fahrenheit.

As indicated above, the ratio of EVOH copolymer to nylon in the blends will, of course, have a very significant effect upon the nature of the film produced. Thus, the higher the proportion of EVOH copolymer present in the composition the greater will be its oxygen barrier capabilities; tensile, tear and impact strength, and adhesive properties will generally (although, quite surprisingly, not invariably) increase in proportion to the amount of nylon present, and the cost of the blend will be reduced commensurately. Insofar as oxygen barrier properties are concerned, little improvement is generally realized until the concentration of EVOH copolymer in the composition reaches about 20 percent; therefore, that represents a preferred lower limit upon the amount of the copolymer to be included, although as low as 10 weight percent can advantageously be used in the production of some films. On the other hand, the structural properties of ethylene vinyl alcohol resin are not substantially improved unless at least about 10 weight percent (based upon the total composition) of the film-forming nylon is blended therewith; hence, that will usually represent a practical lower limit upon the amount of nylon to be used. However, it should be appreciated that the incorporation of nylon in virtually any concentation will generally be of some benefit, as improving orientability as well as enabling cost reductions to be realized Another surprising feature of the films of the invention resides in the fact that as much as 30 weight percent of nylon can be included in the blend without reducing the oxygen barrier properties of the EVOH resin significantly, and this has generally been found to hold true regardless of the nature of the nylon used or of the plasticizing agent incorporated therewith. Finally, the inclusion of nylon is generally seen to produce a significant decrease in moisture sensitivity of the film (as compared to films of EVOH alone), which is unexpected, in view of the moisture sensitivity that is exhibited by nylon, itself. The effect is particularly notable when the EVOH has a relatively high vinyl alcohol content, and is apparently due to cross-linking between the hydroxyl groups and the amide groups of the nylon molecule.

Exemplary of the efficacy of the present invention are the following specific Examples:

EXAMPLE ONE

Nylon 6, having a molecular weight of about 25,000 and a melting point temperature of about 430° Fahrenheit, is compounded at about 430° to 440° Fahrenheit with SANTICIZER 9 to produce a preblend containing 85 percent by weight of the nylon 6 and 15 percent of the plasticizer. Pellets of the foregoing preblends and of EVOH copolymer (Kuraray EP-F) are then admixed in a ribbon blender, in proportions to provide 25:75 and 75:25 blends of each of the two ingredients (i.e., the preblend and the EVOH). These are then converted into films by forcing them through an extrude at about 460° Fahrenheit and onto a chill roll maintained at a temperature of about 100° Fahrenheit, from which the films are recovered for orienting; they are about 8 mils thick and about 20–22 inches wide.

The films are heated to a temperature of about 150° Fahrenheit, and are stretched between two sets of rolls rotating at different speeds: the draw ratios are increased until the film tears or holes develop therein. As a result, it is seen that the 75:25 (preblend: EVOH) film is capable of monoaxial orientation to a draw ratio of about 4:1, whereas the 25:75 film attains a ratio of about 4.5:1 before any failure is evidenced. A film of the same nylon, by itself, is found to fail at a draw ratio of about 4:1. Thus, it is seen that, by the practice of the present invention, higher levels of orientation may be achieved, as compared to those possible using the unmodified nylon resins.

Upon testing, the present films are found to exhibit oxygen transmission rates that are substantially below those exhibited by standard biaxially oriented nylon of equal thickness, and they are found to have a level of flex-crack resistance that is comparable to the standard nylon film. Thus, the film of the invention may be used to good advantage in certain applications, such as for condiment webs and for pouches for ground coffee, wherein good gas barrier properties and abuse resistance are of prime importance. This can represent a considerable cost savings over biaxially oriented nylon, not only because of the need to orient the nylon in a second direction, but also because of the need to add moisture-barrier capability to it, such as by metallization or by oating with saran. The monoaxial orientation of present films also renders them particularly well-suited (as compared to the unoriented films) for use in conversion operations, because their relative non-extensibility in the orientation direction facilitates web severance considerably.

EXAMPLE TWO

Nylon preblends are prepared and are blended with EVOH, both steps being carried out in the manner described in the foregoing Example. In this Example, however, the EVOH copolymer employed is EP-E, and the nylon is plasticized with either 5 weight percent of SANTICIZER 9 or is a 50:50 or 76:24 mixture of nylon 6 and nylon 12 (having a molecular weight of about 25,000 and a melting point temperature of about 347° Fahrenheit). Three blends (A,B and C) are prepared by admixing the EVOH and the SANTICIZER-plasticized nylon preblend in relative proportions of 50:50, 70:30 and 90:10, respectively, and fourth and fifth blend (D and E) are made by admixing the EVOH and nylon/nylon preblend in a 60:40 ratio (using the 50:50 nylon blend) and a 75:25 ratio (using the 76:24 nylon blend), respectively.

Each of the foregoing blends is coextruded with an EVA composition to produce a three-layer laminate in which the nylon/EVOH blend constitutes a core layer between layers of the EVA composition, the latter being a 40:60 blend of UE 80159 (12% VA) and NA 80479 (4.5% VA), both sold by the U.S. Industrial Chemicals Co. Blown coextrusion and biaxial orientation are effected utilizing a conventional "double bubble" technique, with the core being extruded at a temperature of about 440° to 460° Fahrenheit, to produce a tape with a nominal thickness of about 20 mils. The tape is water quenched at about 100° Fahrenheit, and is thereafter reheated in a water bath to about 210° Farhenheit, at about which temperature it is drawn and blown at respective ratios of about 3:1 and 3.5:1. The lamina thicknesses are determined, and the films are tested for strength and oxygen-barrier capability.

The film designated A has a layer profile (inner-to-outer, EVA/core/EVA) of 1.95/0.20/0.73, and exhibits an oxygen permeability of about 319 cubic centimeters/square meter of surface area/24 hours, at 73° Fahrenheit and 100 percent relative humidity, utilizing for the determination a MoCon oxygen analyzer with wet pads adjacent the test sample; this corresponds to a transmission rate of about 64 cubic centimeters per mil thickness of the core layer. Similar determinations using films B, C, D, and E (having respective layer profiles of 1.75/0.24/0.67, 1.66/0.22/0.53, 1.94/0.16/0.67, and 1.41/0.16/0.53) indicate overall and per mil of core oxygen transmission rates of 179/43, 106/23.3, 254/40.6 and 154/24.6 cubic centimeters, respectively. For the sake of comparison, similar films having core layers of the EVOH alone and of the nylon alone exhibit per mil of core permeabilities of 19.5 and 145.5, respectively, under the same conditions and expressed in the same units. Moreover, oxygen transmission rates are found to be similarly improved under zero relative humidity conditions (73° Fahrenheit), film E, for example, exhibiting a per mil of core value of 4.6 cubic centimeters, as compared to values of 1.9 and 54.5 for the EVOH- and nylon- core webs, respectively.

Although the values vary depending upon the proportions of EVOH and nylon in the core layers, the tensile strength and tensile energy absorption of the films of the invention are generally significantly higher (in both the machine and also the cross-machine directions) than are those of the films containing only EVOH in the core; the machine direction tensile strengths are normally better in the blend core than in the nylon core films, and generally they are at least about equal in the cross-machine direction. On a per mil basis, the total energy impact strengths of the instant films (as determined by a dart drop test at 73° Fahrenheit) are better than either of the single-component core films, and dramatically so in comparison with the unmodified EVOH webs. Finally, haze and gloss values of all webs are found to be about the same.

EXAMPLE THREE

The procedures of the foregoing Example are repeated to produce three additional film samples (F, G and H) utlizing as the core blend a 90:10 EVOH:nylon mixture of GL-D and ULTRAMID (sample F), a 50:50 mixture of EP-E and UNITIKA 1030 (sample G), and a 50:50 mixture of EP-E and Huels 4018 (sample H). Samples F, G and H have layer profiles (EVA/core/EVA) of 2:10/0.15/0.68, 1.40/0.22/0.59, and 1.76/0.18/0.59, and show (on a per mil of core basis) oxygen permeabilities at 73° Fahrenheit and 100 percent relative humidity of 91.3, 74.6 and 39.4 (cubic centimeters/square meter/24 hours), respectively. Particular note should be made of the value exhibited by the film of sample F, which can be contrasted with an oxygen transmission rate (per mil) for a comparable film, but containing only the GL-D resin in the core, that is in excess of about 150 cubic centimeters, under the same conditions of determination. It is believed that the improved results are attributable to crosslinking that occurs between the amide and the vinyl alcohol, which is most pronounce here because of the relatively high (i.e., about 71 percent) vinyl alcohol content of the EVOH component, which in turn makes the blend less moisture sensitive than is the unmodified EVOH resin.

Thus, it can be seen that the present invention provides novel, molecularly oriented films produced from blends of nylon and EVOH, which films exhibit high degrees of toughness, strength, clarity and heat stability, while also exhibiting low moisture sensitivity and oxygen transmission rates, and which are produced in relatively thin gauges. The invention also provides novel methods by which such films are readily produced.

Having thus described the invention, what is claimed is:

1. A film of, or a laminate structure including as an element thereof,
    a heterogenous melt blended composition consisting essentially of:
    (1) a polyamide, and
    (2) from 1 to 90% by weight of an ethylene-vinyl alcohol copolymer having 15 to 65 mol percent ethylene;
    in the absence of a plasticizer,
    said composition having been processed at a temperature of from about 225° C. to 252° C. and being substantially free of cross-linking.

2. A molecularly oriented multilayer film having good strength, toughness and oxygen barrier properties comprising: (a) a first layer produced from a synthetic resin blend of about 90 to 10 weight percent of a nylon resin, conversely, about 10 to 90 weight percent of ethylene vinyl alcohol copolymer having a molecular weight of about 15,000 to 30,000 and a melting point temperature of about 325° to 375° F., and up to about 25 percent, based upon the weight of said nylon resin, of a plasticizer therefor, said blend being processable at a temperature approximately the processing temperature of said copolymer and below the temperature at which any substantial amount of degradation would occur therein under appropriate conditions for extrusion; and (b) at least a second layer having a composition different from that of said first layer, said film having been molecularly oriented by stretching, in at least one direction, at ratio of at least 2:1.

3. The film of claim 2 wherein said second layer comprises a resin selected from the group consisting of ethylene/organic acid ester copolymers, polyolefins, film-forming nylons, ionomer resins, partially hydrolyzed ethylene/vinyl acetate copolymer adhesives, and anhydride-modified polyolefin adhesives.

4. The film of claim 3 wherein said film additionally includes a third layer of a composition different from that of said first layer, said first layer constituting a core interposed between said second and third layers.

5. The film of claim 4 wherein said first layer comprise an EVOH/nylon copolymer blend, and said second and third layers comprise film-forming nylon homopolymer resins.

6. The film of claim 4 wherein said second and third layers comprise ethylene/vinyl acetate copolymer resins.

7. A molecularly oriented multilayer nylon film having good strength, toughness and oxygen barrier properties comprising a coeoxtrudate of: a core layer produced from a synthetic resin blend of about 90 to 10 weight percent of a first nylon resin, about 10 to 90 weight percent of ethylene vinyl alcohol copolymer having a molecular weight of about 15,000 to 30,000 and a melting point temperature of about 325° to 375° F., and up to about 25 percent, based upon the weight of said first nylon resin, of a plasticizer therefor, said blend being processable at a temperature approximately the processing temperature of said copolymer and below the temperature at which any substantial amount of degradation would occur therein under appropriate conditions for extrusion; and an outer layer on each side of said core layer and in direct surface contact therewith, said outer layers being comprised of a second, film-forming nylon resin of a composition different from said first nylon resin, said film having been molecularly oriented by stretching in at least one direction at ratio of at least 2:1.

8. The film of claim 7 wherein said blend comprises about 75 to 25 weight percent of said first nylon resin, about 25 to 75 weight percent of said ethylene vinyl alcohol copolymer, and at least about 2 percent of said plasticizer, based upon the weight of said first nylon resin, said first nylon resin having a molecular weight of about 20,000 to 30,000 and a melting point temperature of about 415° to 440° F., and said plasticizer being effective to lower the processing temperature of said nylon resin to approximately that of said copolymer.

9. The film of claim 7 wherein said ethylene vinyl alcohol copolymer has a molecular weight of about 18,000 to 25,000, and wherein said processing temperature is about 400° F.

10. The film of claim 8 wherein said plasticizer is selected from the group consisting of long chain fatty acid amides, aromatic sulfonamides, and polyamides and copolyamides having a molecular weight of about 5,000 to 25,000 and a melting point temperature below about 400° F.

11. The film of claim 10 wherein said plasticizer is selected from the class consisting of lauramide, o,p-toluenesulfonamide, N-ethyl-o,p-toluenesulfonamide, and polyamides of 7,000 to 10,000 molecular weight.

12. The film of claim 7 wherein at least a portion of said first nylon resin in said blend is an ingredient selected from the group consisting of nylon random copolymers, nylon block copolymers, nylon alloys and nylon homopolymers, said ingredient having a melting point temperature below about 400° F.

13. The film of claim 12 wherein said group comprises nylon 12, nylon 6,12, nylon 6,36, nylon 6,6, nylon 6/polyolefin alloys, and nylon 12/polyether or polyolefin block copolymers.

14. The film of claim 12 wherein said core layer comprises an EVON/nylon copolymer blend, and said outer layers comprise nylon homopolymer resins.

15. A laminate structure comprising a layer of a first resin having a composition different from that of the melt blended composition described wherein; and at least one adjacent layer of a heterogeneous melot blended composition consisting essentially of: a polyamide; and from 10 to 90% by weight of an ethylene vinyl alcohol copolymer having 10 to 45 mol percent ethylene, in the absence of plasticizer, wherein there are regions of ethylene vinyl alcohol copolymer having an average diameter of less than 500 angstroms in the polyamide, said composition having been processed at a temperature of from about 225° C. to 252° C. and being substantially free from crosslinking.

16. The laminate as recited in claim 15 wherein the polyamide is polyepsilocaprolactam.

17. The laminate as recited in claim 16 wherein there is from 10 to 30 percent ethylene vinyl alcohol copolymer in the layer containing polyepsiloncaprolactam.

18. The laminate as recited in claim 15 wherein there is from 10 to 50 percent ethylene vinyl alcohol copolymer in the layer containing the polyamide.

19. A film having a thickness of from about 0.4 mils to about 20 mils made from a heterogeneous melt blended composition consisting essentially of: a polyamide; and from 10 to 90% by weight of an ethylene vinyl alcohol copolymer having 20 to 45 mol percent ethylene, in the absence of plasticizer, wherein there are regions of ethylene vinyl alcohol copolymer having an average diameter of less than 500 angstroms in the polyamide, said compositions having been processed at a temperature of from about 225° C. to 252° C. and being substantially free from crosslinking.

20. A heterogeneous melt blended composition consisting essentially of a polyamide; and from 10 to 90 percent by weight of an ethylene vinyl alcohol copolymer having 20 to 45 mol percent ethylene, in the absence of plasticizer, said composition having been processed at a temperature of from about 225° C. to 252° C. and being substantially free from crosslinking.

21. A heterogeneous melt blended composition consisting essentially of polyepsilocaprolactam; and from 10 to 90 percent by weight of the polyepsiloncaprolactam of an ethylene vinyl alcohol having 20 to 45 mol percent ethylene, in the absence of plasticizer, said composition having been processed at a temperature of from about 225° C. to 252° C. and being substantially free from crosslinking.

22. The composition as recited in claim 21 wherein there is from 10 to 50 percent by weight of the polyepsiloncaprolactam of the ethylene vinyl alcohol copolymer.

23. The composition as recited in claim 22 wherein there is from 10 to 30 percent by weight of the polyepsiloncaprolactam of the ethylene vinyl alcohol copolymer.

24. The composition as recited in claim 23 formed into a film.

25. The composition as recited in claim 21 wherein polyepsiloncaprolactam and ethylene vinyl alcohol are blended to have ethylene vinyl alcohol copolymer regions of less than 500 angstroms.

26. The composition of as recited in claim 25 wherein the ethylene vinyl alcohol regions are predominantly between 20 and 100 angstroms.

27. The composition as recited in claim 21 wherein there is from 30 to 65 percent by weight of the ethylene vinyl alcohol copolymer.

28. The composition as recited in claim 21 wherein there is from about 10 to about 20 percent by weight of the ethylene vinyl alcohol copolymer.

29. The composition as recited in claim 21 wherein the ethylene vinyl alcohol copolymer contains 20 to 45 mol percent ethylene.

30. A method of preparing a heterogeneous melt blended composition consisting essentially of polyepsiloncaprolactam, from 10 to 90 percent by weight of an ethylene vinyl alcohol copolymer comprising the step of melt blending the polyepsiloncaprolactam and ethylene vinyl alcohol copolymer at a temperature of from about 225° C. to 240° C. in the absence of plasticizer, whereby there are regions of ethylene vinyl alcohol copolymer having an average diameter of less than 500 angstroms in the polyepsiloncaprolactam and the composition is substantially free from crosslinking.

31. The method as recited in claim 30 wherein the composition is blended until the ethylene vinyl alcohol regions in the blend are from 20 to 100 angstroms.

32. The composition as recited in claim 20 wherein the composition was processed at a temperature of about 225° C. to 240° C.

33. The composition as recited in claim 21 wherein the composition was processed at a temperature of about 225° C. to 240° C.

34. In a method for the production of a film having good strength, toughness and oxygen barrier properties, the steps comprising:
   a. forming a blend of about 90 to 10 weight percent of a nylon resin, conversely about 10 to 90 weight percent of an ethylene vinyl alcohol copolymer having a molecular weight of about 15,000 to 30,000 and a melting point temperature of about 325° to 375° Fahrenheit, and up to about 25 percent, based upon the weight of said nylon resin, of a plasticizer therefor, the processing temperature of said blend being at a value approximating that of said copolymer and below the temperature at which any substantial amount of degradation would occur therein under appropriate conditions for extrusion;
   b. heating said blend to said processing temperature;
   c. forcing said blend through an extrusion die to produce a film of said blend;
   d. adjusting the temperature of said film to permit effective molecular orientation therein;
   e. stretching said film at about said temperature to effect at least uniaxial molecular orientation therein; and
   f. cooling said film to obtain a product of relatively thin gauge having such desirable levels of strength, toughness and oxygen barrier capability.

35. The method of claim 34 wherein said processing temperature is in excess of about 400° Fahrenheit.

36. The method of claim 35 wherein said processing temperature is about 430° to 480° Fahrenheit.

37. The method of claim 34 wherein said nylon resin has a molecular weight of about 20,000 to 30,000 and a melting point temperature of about 415° to 440° Fahrenheit, and wherein said plasticizer is present in an amount of at least 2 percent, based on said nylon resin, and is selected from the group consisting of fatty acid amides, aromatic sulfonamides, polyamides and copolyamides having a molecular weight of about 5,000 to 25,000 and a melting point temperature below about 400° Fahrenheit, said plasticizer being effective to lower the processing temperature of said nylon resin to approximately that of said copolymer.

38. The method of claim 37 wherein said plasticizer is selected from the class consisting of lauramide, o,p-toluenesulfonamide, N-ethyl-o,p-toluenesulfonamide and polyamides of 7,000 to 10,000 molecular weight.

39. The method of claim 37 including the additional step of compounding said nylon resin and said plasticizer prior to said step of forming said blend.

40. The method of claim 34 wherein at least a portion of said nylon resin in said blend is an ingredient selected from the group consisting of nylon random copolymers, nylon block copolymers, nylon alloys and nylon homopolymers, said ingredient having a melting point temperature below about 400° Fahrenheit.

41. The method of claim 40 wherein said group comprises nylon 12, nylon 6,12, nylon 6,36, nylon 6,66, nylon 6/polyolefin alloys and nylon 12/polyether or polyolefin block copolymers.

42. The method of claim 34 including the additional step of introducing into said extruder a second resin having a composition different from that of said blend, said second resin being combined with said blend in said die to produce a laminar structure of plural layers, and said structure being extruded from said die as a multilayer film inc.luding one layer comprised of said blend and a second layer comprised of said resin.

43. The method of claim 42 wherein said resin is selected from the group consisting of ethylene/organic acid ester copolymers, polyolefins, film-forming nylons, ionomer resins, partially hydrolyzed ethylene vinyl acetate copolymer adhesives, and anhydride modified polyolefin adhesives.

44. The method of claim 34 wherein said film is mechanically drawn in a first direction at a ratio greater than about 2:1 to effect molecular orientation therein.

45. The method of claim 44 wherein said draw ratio is at least about 4:1.

46. The method of claim 44 wherein said film is stretched in a direction substantially transverse to said first direction at a ratio greater than about 2:1, thereby producing biaxial molecular orientation in said film.

47. The method of claim 43 wherein said film is a single ply structure, and is produced by casting the extrudate from said step "c" upon a chill roll.

48. The method of claim 46 wherein said film is a tubular structure, and is produced by a blown film technique in said step "c".

49. The method of claim 48 wherein said tubular structure is stretched in said transverse direction by internal fluid pressure.

50. The method of claim 49 wherein said draw and stretch ratios are each at least about 3:1.

51. The method of claim 50 wherein at least one of said ratios is in excess of about 4:1.

* * * * *